(12) United States Patent
Ferguson

(10) Patent No.: US 12,078,418 B2
(45) Date of Patent: Sep. 3, 2024

(54) SLOPED SIDEWALL FOR A FURNACE

(71) Applicant: Systems Spray-Cooled, Inc., Smyrna, TN (US)

(72) Inventor: Scott A. Ferguson, Murfreesboro, TN (US)

(73) Assignee: Systems Spray-Cooled, Inc., Smyrna, TN (US)

( * ) Notice: Subject to any disclaimer, the term of this patent is extended or adjusted under 35 U.S.C. 154(b) by 987 days.

(21) Appl. No.: 16/918,788

(22) Filed: Jul. 1, 2020

(65) Prior Publication Data

US 2022/0003498 A1 Jan. 6, 2022

(51) Int. Cl.
| | |
|---|---|
| *F27B 3/24* | (2006.01) |
| *B05B 1/20* | (2006.01) |
| *F27B 3/16* | (2006.01) |
| *F27D 1/12* | (2006.01) |
| *F27B 3/08* | (2006.01) |
| *F27D 9/00* | (2006.01) |

(52) U.S. Cl.
CPC .............. *F27B 3/24* (2013.01); *B05B 1/20* (2013.01); *F27B 3/16* (2013.01); *F27D 1/12* (2013.01); *F27B 3/085* (2013.01); *F27D 2009/0016* (2013.01)

(58) Field of Classification Search
CPC .... F27B 3/24; F27B 3/16; F27B 3/085; B05B 1/20; F27D 1/12; F27D 2009/0016; F27D 2009/0018; F27D 2009/0032; F27D 2009/007; F27D 2009/0086
See application file for complete search history.

(56) References Cited

U.S. PATENT DOCUMENTS

| | | | |
|---|---|---|---|
| 3,917,479 A * | 11/1975 | Sayce | C03B 5/025 |
| | | | 75/10.34 |
| 4,259,539 A | 3/1981 | Elsner et al. | |
| 2006/0091590 A1* | 5/2006 | Arthur | F27D 9/00 |
| | | | 266/193 |
| 2010/0044935 A1 | 2/2010 | Medina | |
| 2018/0254455 A1 | 9/2018 | Yoshimaru et al. | |

(Continued)

FOREIGN PATENT DOCUMENTS

| | | |
|---|---|---|
| CN | 201293542 Y | 8/2009 |
| KR | 20200004321 A | 1/2020 |

OTHER PUBLICATIONS

International Search Report and Written Opinion for PCT/US2021/035082 dated Sep. 24, 2021.

(Continued)

*Primary Examiner* — Justin C Dodson
(74) *Attorney, Agent, or Firm* — Patterson + Sheridan, LLP

(57) ABSTRACT

Described herein is a sidewall suitable for use in a metallurgical furnace, and metallurgical furnace having the same. The sidewall has an upper wall, an outer wall coupled to an outer side of the upper wall, and extending downward from the outer wall. A sloped wall is coupled to an inner side of the upper wall. The sloped wall extends downward and inward from the upper wall. The sloped wall has a first surface facing the outer wall and a second surface facing a centerline of the sidewall. A spray cooling assembly is disposed between the sloped wall and the outer wall. The spray cooling assembly is configured to spray coolant on the first surface of the sloped wall.

16 Claims, 6 Drawing Sheets

(56) References Cited

U.S. PATENT DOCUMENTS

2019/0219334 A1* 7/2019 Ferguson .............. F27D 1/0033
2019/0383484 A1   12/2019 Ferguson et al.
2020/0025448 A1    1/2020 Ferguson et al.

OTHER PUBLICATIONS

Extended European Search Report from EP 21832724.5 dated Jul. 5, 2024.

* cited by examiner

SLOPED SIDEWALL FOR A FURNACE

BACKGROUND

Field of Endeavor

Embodiments of the present disclosure relates generally to a sidewall for a metallurgical furnace, and a metallurgical furnace having the same.

DETAILED DESCRIPTION

Description of the Related Art

Metallurgical furnaces, such as an electric arc furnace or a ladle metallurgical furnace, are used in the processing of molten materials. A metallurgical furnace has a number of components, including a roof that is retractable, a hearth that is lined with refractory brick, and a sidewall that sits on top of the hearth. The roof can be retracted in order to supply the furnace with metal, which is melted, thereby creating molten materials, and byproducts, such as slag.

For metallurgical furnaces that utilize one or more electrodes as a heating source, an electric arc is generated and sustained by the electrode(s) to form the molten materials. As the refractory brick lining the hearth is exposed below the furnace sidewall, metal loaded into the metallurgical furnace often contacts and damages the refractory brick. Damaged refractory brick may allow the underlying metal material comprising the metallurgical furnace to become damaged, consequently requiring the metallurgical furnace to be taken out of service for repair.

As such, there is a need for an improved sidewall for a metallurgical furnace.

SUMMARY

Described herein is a sidewall suitable for use in a metallurgical furnace, and metallurgical furnace having the same. In one example, the sidewall has an upper wall, an outer wall coupled to an outer side of the upper wall, and extending downward from the outer wall. A sloped wall is coupled to an inner side of the upper wall. The sloped wall extends downward and inward from the upper wall. The sloped wall has a first surface facing the outer wall and a second surface facing a centerline of the sidewall. A spray cooling assembly is disposed between the sloped wall and the outer wall. The spray cooling assembly is configured to spray coolant on the first surface of the sloped wall.

In another example, a metallurgical furnace is provided. The metallurgical furnace includes a hearth, and a sidewall disposed on the hearth. The sidewall includes an upper wall, and an outer wall coupled to an outer side of the upper wall and extending downward from the outer wall. A sloped wall is coupled to an inner side of the upper wall. The sloped wall extends downward and inward from the upper wall. The sloped wall has a first surface facing the outer wall and a second surface facing a centerline of the sidewall. A spray cooling assembly is disposed between the sloped wall and the outer wall. The spray cooling assembly is configured to spray coolant on the first surface of the sloped wall.

BRIEF DESCRIPTION OF THE DRAWING

So that the above recited features of the present disclosure can be understood in detail, a more particular description of the disclosure, briefly summarized above, may be had by reference to examples herein, some of which are illustrated in the appended drawings. However, it is to be noted that the appended drawings illustrate only examples and are therefore not to be considered limiting of the disclosure's scope. Accordingly, the appending drawings admit to other equally effective examples.

In order to facilitate understanding, identical reference numerals have been used, where possible, to designate identical elements that are common features. It is contemplated that elements and features of one example may be beneficially incorporated into other examples without further recitation.

DETAILED DESCRIPTION

A sloped sidewall suitable for use in a metallurgical furnace and a metallurgical furnace having the same are described herein. It should be noted however that the disclosed sloped sidewall has utility in other furnaces, particularly those that employ spray cooling to control the temperature of the sidewall.

The metallurgical furnace includes a roof, one or more electrodes, a hearth lined with refractory bricks, and one or more sidewalls supported by the refractory bricks and the hearth. The sidewall has a sloped wall that faces the interior of the metallurgical furnace in which metal is melted. The sloped wall of the sidewall forms a truncated substantially conical profile about a centerline of the furnace. The sloped wall of the sidewall does not need to have a geometrically precise conical form, but rather in cross section, the sloped wall of the sidewall closest the hearth has an inner diameter that is smaller than an inner diameter of the sloped wall of the sidewall closest to the roof. The sidewall also includes an upper wall, a bottom wall, and an exterior wall, that with the sloped wall, includes an internal space. The sloped wall has a hot face and an interior face defining opposites sides of the sloped wall. The hot face faces the interior of the metallurgical furnace, while the cool face faces away from the interior of the metallurgical furnace toward the internal space of the sidewall. A spray cooling assembly is disposed in the internal space of the sidewall to provide coolant to the interior face to control the temperature of the sloped wall.

The hot face is sloped inwardly from the upper wall at an angle toward the centerline of the furnace. The sloped hot face wall advantageously increases volume of internal space of the sidewall compared to conventional sidewalls. The increased internal space provides more space for maintenance personnel to enter the sidewall during routine maintenance or when servicing the spray cooling assembly disposed within the sidewall. The increased internal space allows more efficient and cost effective configurations for the spray cooling assembly.

In addition, because the hot face is angled toward the center of the hearth, metal contacting the hot face wall is redirected towards the center of furnace. By concentrating metal closer to the center of the furnace, more efficient melting is enabled as the metal is disposed closer to the electrode(s) positioned near the centerline of the furnace. Concentrating metal towards the center of the furnace increases melting efficiency, which requires less electricity. By utilizing less electricity, the cost of production is advantageously decreased.

Figure 1:
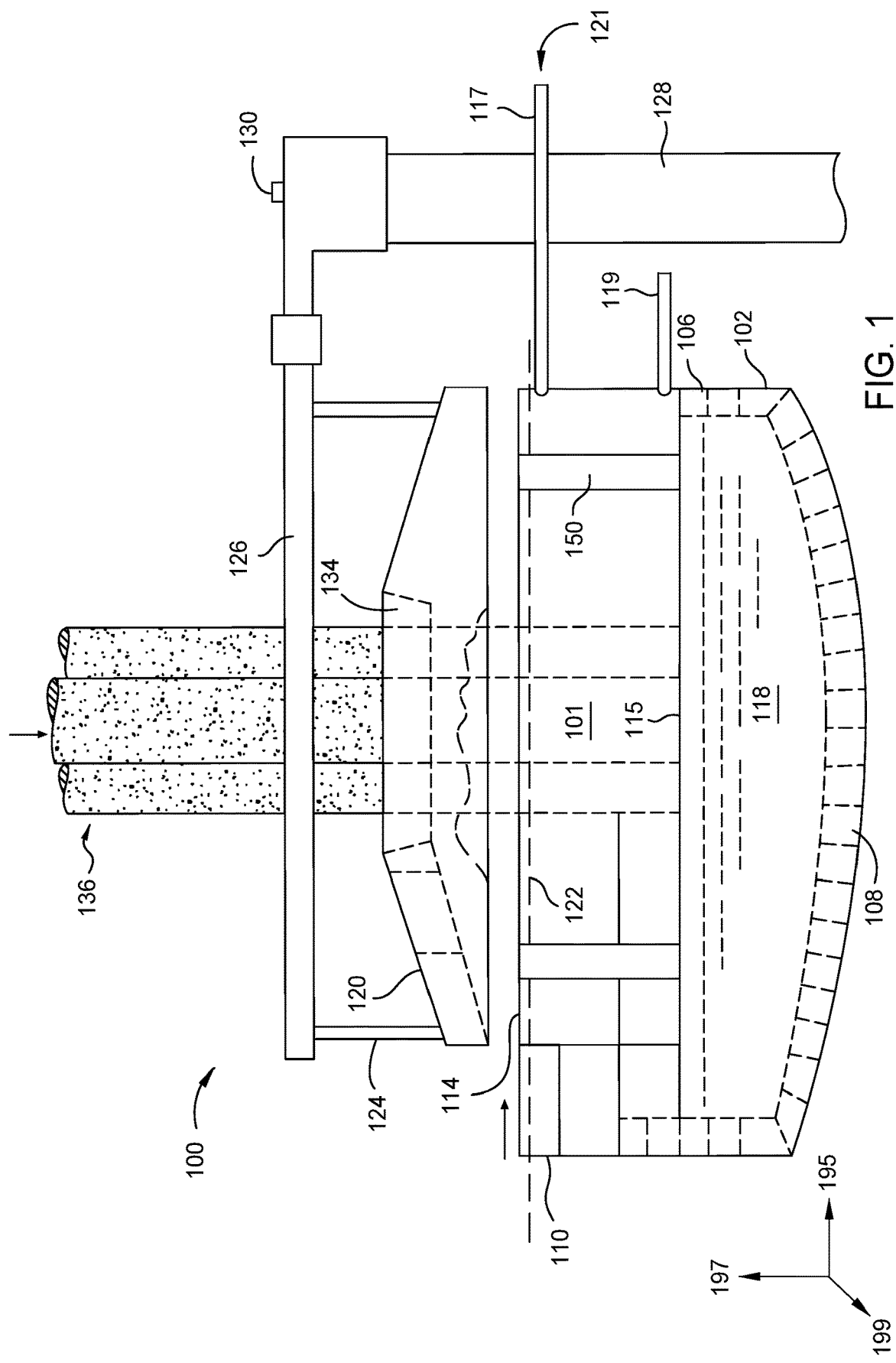
FIG. 1 illustrates a side view of a metallurgical furnace having a roof.

FIG. 1 shows a side view of the metallurgical furnace having a body 102 and a roof 120. In FIG. 1, an x-direction 195 is shown perpendicular to a y-direction 197. A z-direction 199 is depicted orthogonal to the x-direction 195 and orthogonal to the y-direction 197.

The body 102 depicted in FIG. 1 includes sidewall 110 disposed on a hearth 106. The body 102 may be generally cylindrical in shape and have an elliptical bottom.

The hearth 106 is lined with refractory bricks 108. The sidewall 110 has an upper wall 114 and a bottom wall 115. The roof 120 is moveably disposed on the upper wall 114 of the sidewall 110. The bottom wall 115 of the sidewall 110 is removably disposed on the hearth 106.

A cooling system 121 is utilized to control the temperature of sidewall 110. The cooling system 121 has an input cooling port 117 for introducing coolant into the sidewall 110. The cooling system 121 also has a drain port 119 that empties spent coolant from the sidewall 110. Additional details of the cooling system 121 are discussed below.

The metallurgical furnace 100, including the body 102 and the roof 120, is rotatable along a tilt axis 122 about which the metallurgical furnace 100 can tilt. The metallurgical furnace 100 may be tilted in a first direction about the tilt axis 122 toward a door multiple times during a single batch melting process, sometimes referred to as a "heat", in order to remove slag. Similarly, the metallurgical furnace 100 may be tilted in a second direction about the tilt axis 122 towards a tap spout (not shown) multiple times during a single batch melting process to remove a molten material 118 disposed in the internal region of the metallurgical furnace 100 surrounded be the refractory bricks 108.

Roof lift members 124 may be attached at a first end to the roof 120. The roof lift members 124 may by chains, cables, ridged supports, or other suitable mechanisms for supporting the roof 120. The roof lift members 124 may be attached at a second end to one or more mast arms 126. The mast arms 126 extend horizontally, spreading outwards from a mast support 128. The mast support 128 is supported by a mast post 130. The mast support 128 can rotate about the mast post 130. Alternately, the mast post 130 may rotate with the mast support 128 in order to move the roof lift members 124. In another example, roof lift members 124 may be aerially supported to move the roof 120. In an alternative example, the roof 120 is configured to swing or lift away from the sidewall 110. The roof 120 is lifted away from the sidewall 110 to expose an opening 101, i.e. an interior volume of the metallurgical furnace 100 through the upper wall 114 of the sidewall 110 for loading material therein.

The roof 120 may be circular in shape. In at least one example, the roof 120 is spray-cooled utilizing the cooling system 121 or other suitable temperature control mechanism. A central opening 134 may be formed through the roof 120. One or more electrode(s) 136 extend through the central opening 134 from a position above the roof 120 into the opening 101. During operation of the metallurgical furnace 100, the electrode(s) 136 are lowered through the central opening 134 into the opening 101 of the metallurgical furnace 100 to provide electric arc-generated heat to melt metal, producing the molten material 118. In one example, the roof 120 includes an exhaust port (not shown) to remove fumes generated within the metallurgical furnace 100.

Figure 2:
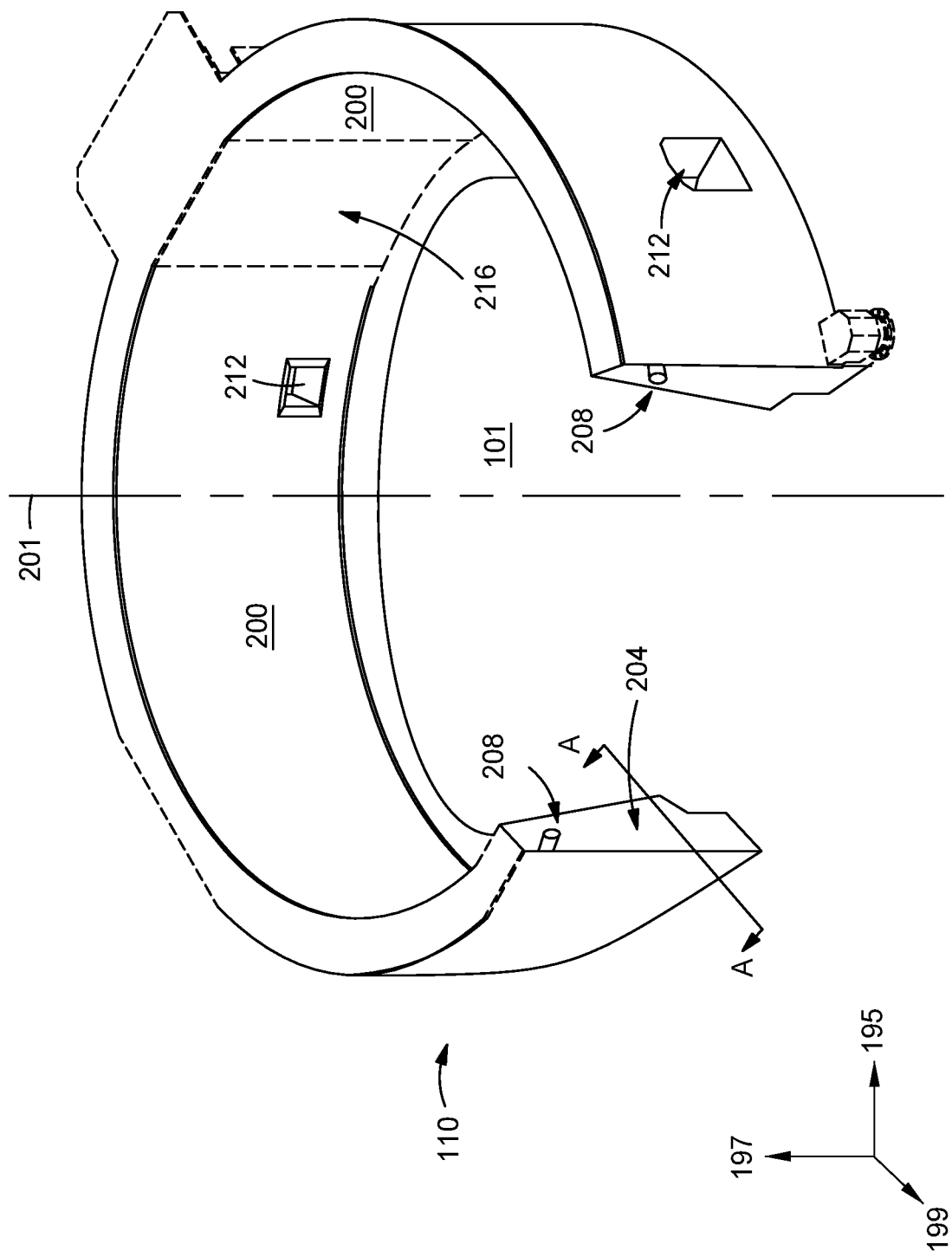
FIG. 2 is an isometric view of the sidewall shown in FIG. 1 having a partial cutaway.

FIG. 2 is an isometric view of the sidewall 110 shown in FIG. 1 having a portion of the sidewall 110 cutaway. The sidewall 110 is shown radially disposed in the z-direction 199 about a centerline 201. The centerline 201 is parallel to the y-direction 197, and the centerline 201 is the radial center the opening 101. When the sidewall 110 is installed on the hearth 106 of the metallurgical furnace 100, the opening 101 provides a passage for which metal, scrap metal, or other meltable material to enter the metallurgical furnace 100 to be melted.

The sidewall 110 has an internal space 204 in which a spray cooling assembly 208 is disposed. The spray cooling assembly 208 is part of the cooling system 121 utilized to control the temperature of the sidewall 110 when the metallurgical furnace 100 is in operation. The spray cooling assembly 208, discussed in detail below, can include one or more parts that are concentrically disposed within the internal space 204 of the sidewall 110. The spray cooling assembly 208 is configured to flow a coolant, such as water provided from the cooling system 121, onto the cool face of the sloped side wall. The coolant is not limited to water or water-based liquids, and may be an aqueous liquid, foam, or non-aqueous cooling liquid. When the sidewall 110 is disposed on the hearth 106 of the metallurgical furnace 100, spray cooling assembly 208 is connected to the input cooling port 117 for introducing coolant into the internal space 204.

In one example, the sidewall 110 of the metallurgical furnace 100 may include one or more apertures 212. The apertures 212 extend through the sidewall 110, thus providing physical access to the opening 101. In one example, the aperture 212 may be utilized to provide access to the opening 101 for a burner nozzle.

In another example, the sidewall 110 includes one or more doors 216. The doors 216 may be utilized to remove slag and to remove the molten material 118 in the manner discussed above.

Figure 3A:
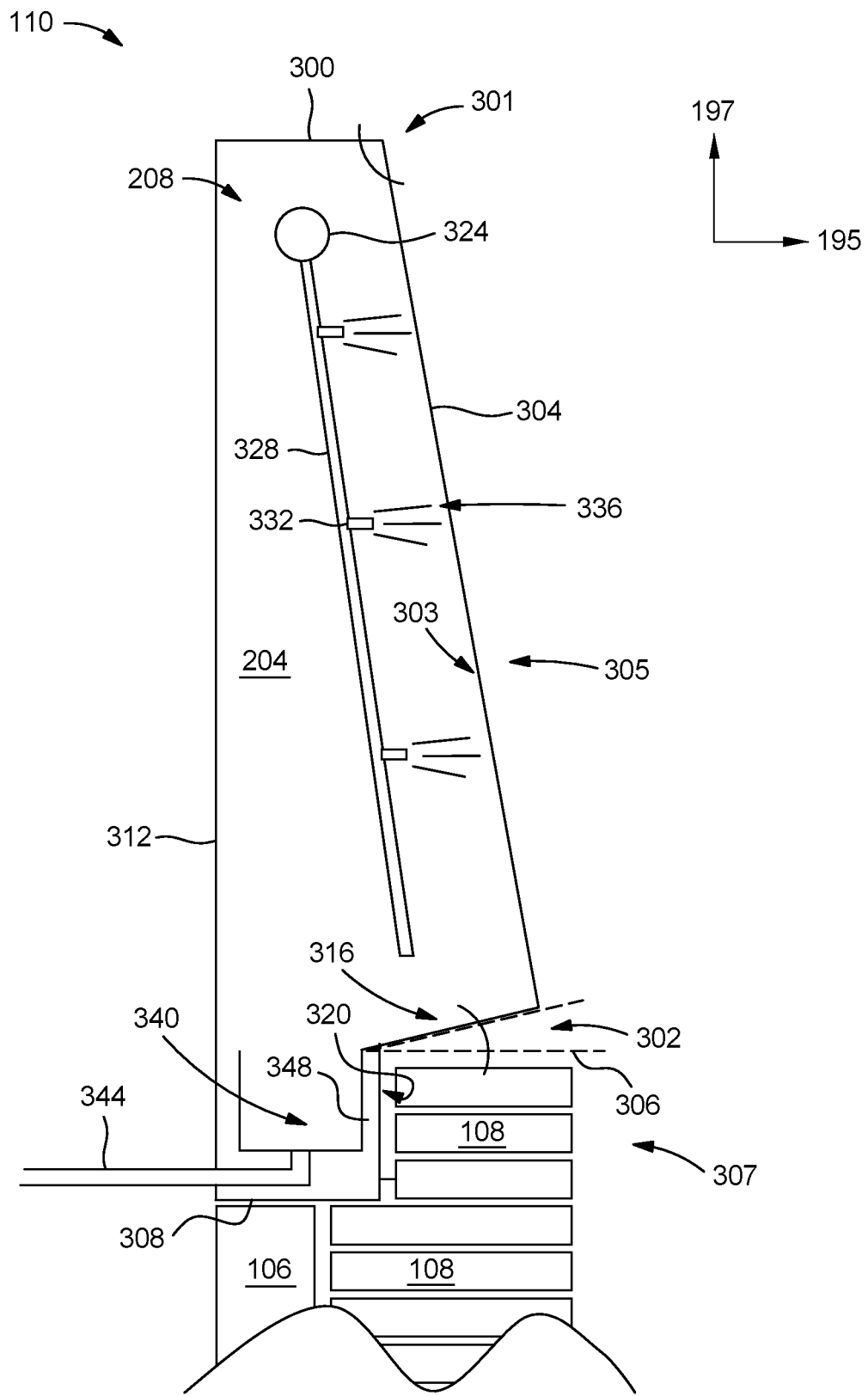
FIG. 3A is sectional view of one example of the sidewall shown in FIG. 2 along line A-A.

FIGS. 3A-3D show several alternative configurations of the sidewall 110. Turning first to FIG. 3A, the sidewall 110 is shown in a sectional view taken along section line A-A depicted in FIG. 2. The sidewall 110 includes an upper wall 300, a sloped wall 304, a bottom wall 308, and an exterior wall 312. The sidewall 110 also includes a return wall 316 and a lower wall 320. The return wall 316 and the lower wall 320 connect the sloped wall 304 to the bottom wall 308 in a manner that forms a recess 307 under the sloped wall 304. The recess 307 is sized to accommodate one or more refractory bricks 108. An inner surface 303 (e.g., cool face) of the sidewall 110 faces the internal space 204. An outer surface 305 (e.g., hot face) of the sidewall 110 is opposite the inner surface 303. As such, the outer surface 305 of the sloped wall 304 faces the opening 101. As previously noted, the centerline 201 is the center of the opening 101. The inner surface 303 of the sloped wall 304 faces the internal space 204 of the sidewall 110.

The sloped wall 304 extends inward and downward from the upper wall 300 at a first angle 301. The first angle 301 of the sidewall 110 is formed between the inner surface 303 of the upper wall 300 and the inner surface 303 of the sloped wall 304. A second angle 302 is formed between the return wall 316 and an imaginary line 306. The imaginary line 306 extends perpendicular to the centerline 201, along the x-direction 195. The imaginary line 306 is also parallel to the bottom wall 308. The first angle 301 is greater than 90 degrees and less than about 145 degrees. The second angle 302 is greater than or equal to zero degrees, for example between zero and 45 degrees. In one example, the first angle 301 is between about 95 degrees and 115 degrees. In another example, the first angle 301 is between about 120 degrees and 135 degrees. In an alternative example, the first angle 301 is 130 degrees. The second angle 302 is between about 15 degrees and 25 degrees, in one example. Alternatively, the second angle 302 is between about 30 degrees and 40 degrees. The second angle 302 may be about 45 degrees.

In another example, the second angle 302 can be proportionate to the height of the exterior wall 312. For example, as the height of the exterior wall 312 increases, a magnitude of the second angle 302 may decrease. As such, the second angle 302 can increase as the height of the exterior wall decreases.

The spray cooling assembly 208 shown in FIG. 2 is illustrated in additional detail in FIG. 3A. The spray cooling assembly 208 includes a header pipe 324, a plurality of branch conduits 328 coupled to the header pipe 324, and an array of spray nozzles 332 coupled to the branch conduits 328. The header pipe 324 is coupled to the input cooling port 117. The header pipe 324 is generally located at or near the upper wall 300 within the internal space 204. The branch conduits 328 extend downward from the header pipe 324. In one example, the branch conduits 328 extend downward in a non-vertical orientation from the header pipe 324 such that the distal end of the branch conduits 328 is farther from the exterior wall 312 than the end of the branch conduit 328 that is coupled to the header pipe 324. Advantageously, the non-vertical orientation of the branch conduit 328 provides more space for servicing within the internal space 204. In example, the branch conduit 328 maintains a substantially constant distance from the sloped wall 304. Although only one branch conduit 328 is shown in the sectional view of FIG. 3A, but it is to be appreciated that the branch conduit 328 are distributed around the internal space 204 such that coolant may be supplied to essentially the entire cool face of the sloped wall 304.

Each nozzle 332 is coupled to the branch conduit 328. A cooling fluid 336 is sprayed from the nozzles 332 onto the inner surface 303 of the sloped wall 304. The cooling fluid 336 is one example of the coolant introduced into the internal space 204 through the input cooling port 117, shown in FIG. 1.

In one exemplary configuration of the sidewall 110, the branch conduit 328 is disposed at the first angle 301 relative to the upper wall 300. Stated differently, the branch conduit 328 is substantially parallel to the inner surface 303 of the sloped wall 304.

In each of the configurations disclosed herein, nozzles 332 are arranged to spray cooling fluid 336 onto the inner surface 303 of the sloped wall 304. Cooling fluid sprayed on the inner surface 303 runs down the inner surface 303 to the return wall 316, from which the spent coolant is directed to a drain trough 340 disposed in the internal space 204 above the bottom wall 308. The drain trough 340 generally encircles the return wall 316. As the coolant runs down the inner surface 303, gravity and surface tension interact to cause droplets to fall from the inclined inner surface 303 such that a sheet of coolant flow leaving the inner surface 303 is not formed, thus allowance coolant sprayed from the nozzles 332 closer to the bottom wall 308 to more effectively reach the inner surface 303 without being blocked by a sheet of coolant flow.

The internal space 204 is sufficiently voluminous to enable maintenance personnel to access the inner surface 303 from inside the sidewall 110. In the conventional sidewall (not shown) maintenance of internal components of a sidewall may require disassembly of the sidewall, or provide limited access through maintenance hatches within the conventional sidewall. Advantageously, the sidewall 110 enables inspection and maintenance of the spray cooling assembly 208 to be simplified, enabling personnel to perform routine maintenance from within the sidewall 110 without the limited visibility of restrictive maintenance hatches, or the need to disassemble the sidewall 110 to inspect internal components.

The inner surface of the return wall 316 extends into the internal space 204 beyond the lower wall 320 to the drain trough 340. Cooling fluid 336 flows from the inner surface 303 of the return wall 316 to the return wall 316 and into the drain trough 340. The drain trough 340 is connected to a channel 344. The channel 334 is coupled to the drain port 119 of the cooling system 121. The channel 344 provides a path for the cooling fluid 336 to flow out from the internal space 204 of the sidewall 110 and into the drain port 119 so that spent coolant may be removed from the sidewall 110.

A first gap 348 is defined between the lower wall 320 and the drain trough 340. The first gap 348 isolates the cooling fluid 336 disposed in the drain trough 340 from the lower wall 320. Thus, should the lower wall 320 become pierced, fluid within the sidewall 110 or drain trough 340 cannot leak into the interior of the metallurgical furnace 100 and contact the molten material 118 in the hearth 106.

Figure 3B:
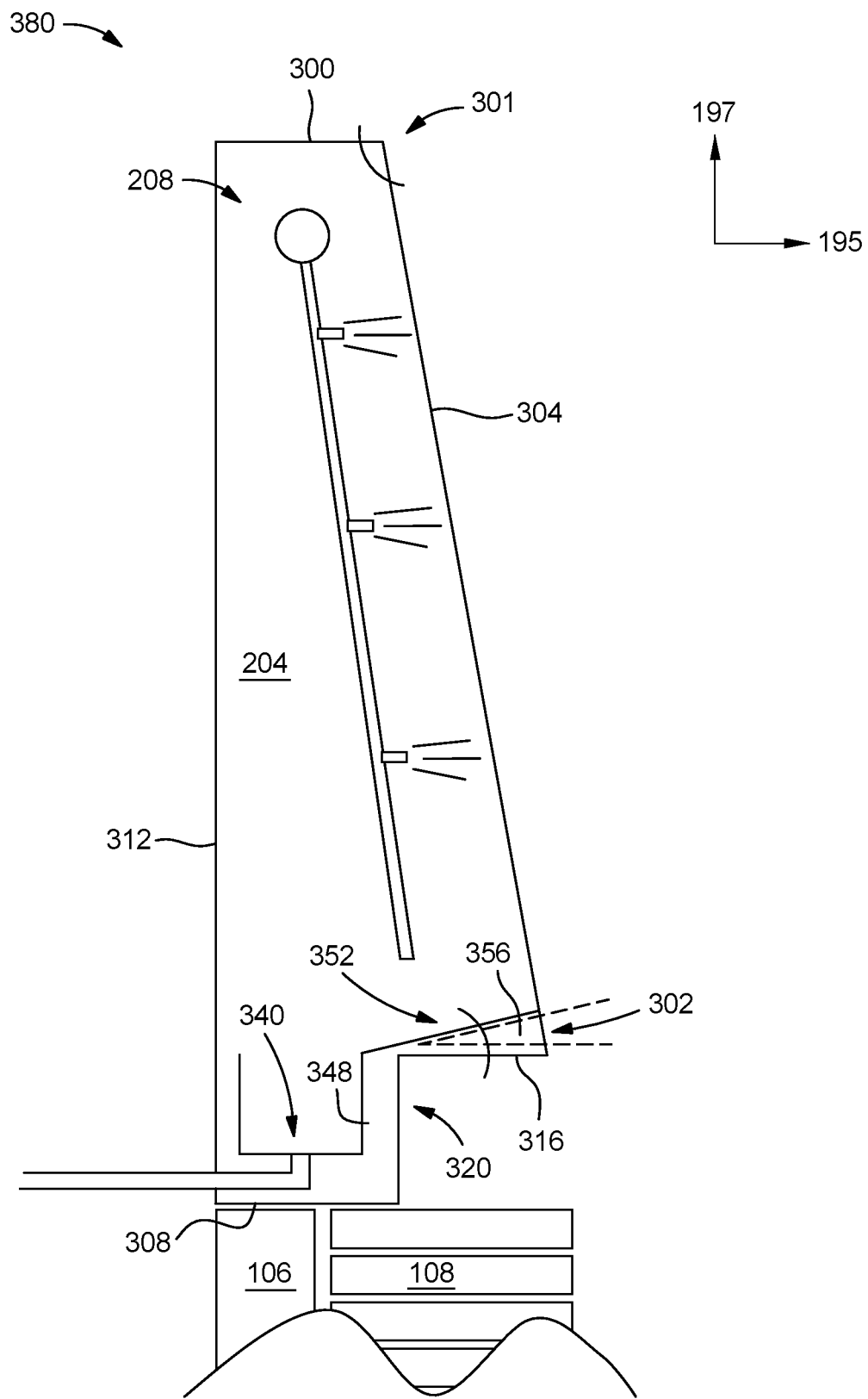
FIG. 3B is another sectional view of another example of a sidewall that may be utilized in the metallurgical furnace shown in FIG. 1.

FIG. 3B is a sectional view of another example of a sidewall 380 that can be utilized in place of the sidewall 110 in the metallurgical furnace 100 of FIG. 1. The sidewall 380 shown in FIG. 3B has the essentially the same features of the sidewall 110 described above except that a false bottom 352 is disposed in the internal space 204 of the sidewall 380 above the return wall 316. The false bottom 352 extends from the inner surface 303 to the drain trough 340 at the first angle 301 to direct spent coolant from inner surface 303 to the drain trough 340. A second gap 356 is formed between the return wall 316 and the false bottom 352. The second gap 356 isolates the cooling fluid 336 flowing on the false bottom 352 from the return wall 316, the lower wall 320 and the portion of the sloped wall 304 disposed between the false bottom 352 and the return wall 316. Thus, if any of these walls 312, 316, 320 and portion of 304 become compromised, cooling fluid 336 flowing on the false bottom 352 remains isolated from these wall and prevented from contacting the molten material 118 in the hearth 106.

Figure 3C:
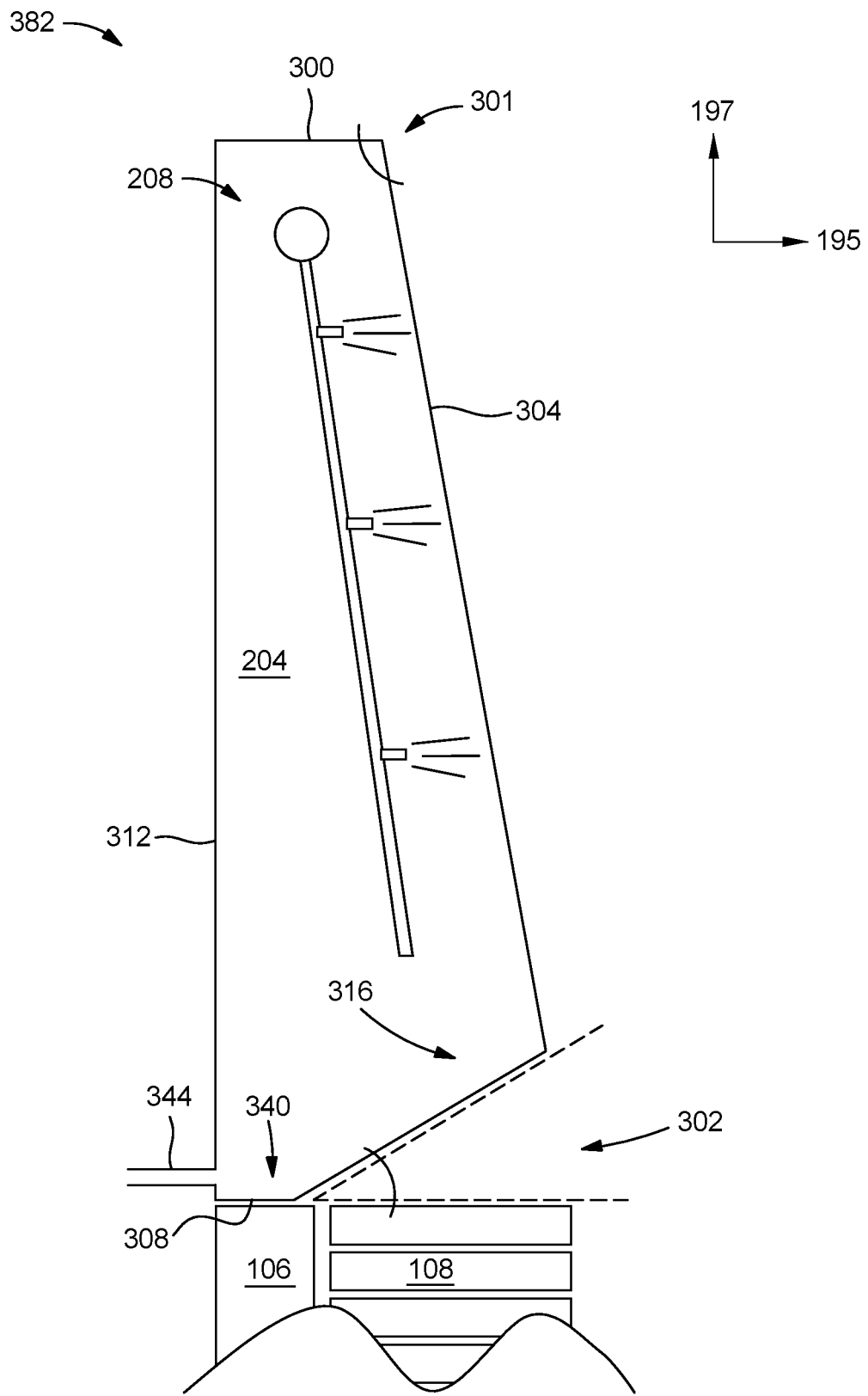
FIG. 3C is another sectional view of another example of a sidewall that may be utilized in the metallurgical furnace shown in FIG. 1.

FIG. 3C is a sectional view of another example of a sidewall 382 that can be utilized in place of the sidewall 110 in the metallurgical furnace 100 of FIG. 1. The sidewall 382 shown in FIG. 3C has the essentially the same features of the sidewall 110 described above except that the return wall 316 is directly coupled to both the inner surface 303 of the sloped wall 304 and the bottom wall 308 of the sidewall 382. Stated differently, there is no lower wall 320 disposed between the sloped wall 304 and the bottom wall 308 of the sidewall 382. The return wall 316 may be disposed at a second angle 302 relative to the bottom wall 308 that is greater than or equal to zero degrees, for example between zero and 45 degrees. A larger second angle 302 allows refractory bricks 108 to be disposed in front of and protect the return wall 316. The inner surface 303 of the return wall 316 extends downward and inward to the bottom wall 308 at the first angle 301. The cooling fluid 336 running down the inner surface 303 of the return wall 316 is directed by the return wall 316 to the drain trough 340. In the example depicted in FIG. 3C, the drain trough 340 is not a distinct structure separate and spaced from walls 312, 308, 320, 316, but rather the drain trough 340 is formed by the channel-like formation defined by the meetings of the walls 312, 308, 316. The cooling fluid 336 in the drain trough 340 exits the internal space 204 through the channel 344. The channel 344 is shown disposed through the exterior wall 312, but is not limited to this configuration. In another example (not shown), the channel 344 may extend through the bottom wall 308. One benefit of the return wall 316, as shown in FIG. 3C, is that since the cooling fluid 336 directly contacts the return wall 316, heat is more effectively removed from the sidewall 110.

Figure 3D:
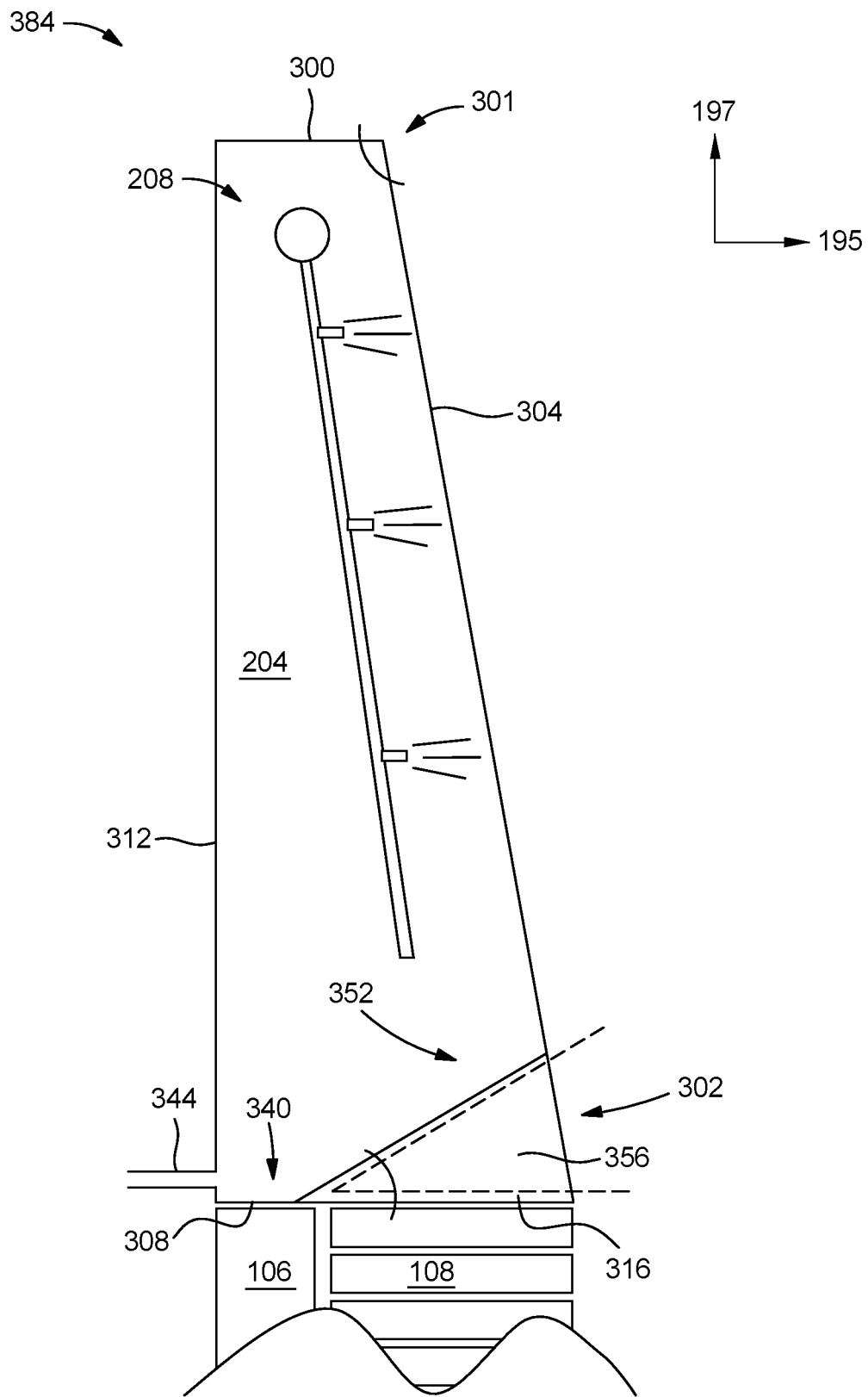
FIG. 3D is another sectional view of another example of a sidewall that may be utilized in the metallurgical furnace shown in FIG. 1.

FIG. 3D is a sectional view of another example of a sidewall 384 that can be utilized in place of the sidewall 110 in the metallurgical furnace 100 of FIG. 1. The sidewall 382 shown in FIG. 3D has the essentially the same features of the sidewall 382 described above except that a false bottom 352 is disposed over the return wall 316. In FIG. 3D, the walls 308, 316 may be coplanar, and are separated by the lower edge of the false bottom 352. The false bottom 352 may be disposed at a second angle 302 relative to the bottom wall 308 that is greater than or equal to zero degrees, for example between zero and 45 degrees. A larger second angle 302 allows a larger second gap 356 to be defined in front of and protect the false bottom 352 should the portion of the sloped wall 304 disposed between the false bottom 352 and the return wall 316 be comprises, thus preventing coolant disposed in the drain trough 340 or running on the false bottom 352 to be leaked into the interior of the metallurgical furnace 100.

Examples disclosed herein relate to sidewall for use in a metallurgical furnace and a metallurgical furnace having the same. Beneficially, the sloped wall of the metallurgical furnace concentrates metal towards the center of the furnace increases melting efficiency, decreasing the cost of production by utilizing less electricity. While the foregoing is directed to specific examples, other examples may be devised without departing from the basic scope thereof, and the scope thereof is determined by the claims that follow.

What is claimed is:

1. A sidewall for a metallurgical furnace, the sidewall comprising:
   an upper wall;
   an outer wall coupled to an outer side of the upper wall and extending downward from the outer wall;
   a sloped wall having a first end coupled to an inner side of the upper wall, the sloped wall extending downward and inward from the upper wall to a second end to define an inwardly sloped section, the sloped wall having a first surface facing the outer wall and a second surface facing a centerline of the sidewall, wherein the second surface of the sloped wall is configured to be exposed to a molten material, and wherein a first distance between the first end and the centerline is greater than a second distance between the second end and the centerline;
   a return wall extending from the sloped wall toward the outer wall, the return wall is sloped downward and outward from the inwardly sloped section of the sloped wall; and
   a spray cooling assembly disposed between the sloped wall and the outer wall, the spray cooling assembly configured to spray coolant on the first surface of the sloped wall.

2. The sidewall of claim 1, wherein the spray cooling assembly further comprises:
   a header pipe;
   a plurality of branch conduits extending from the header pipe towards the return wall; and
   a plurality of nozzles disposed on at least a first branch conduit of the plurality of branch conduits, the plurality of nozzles facing the first surface of the sloped wall.

3. The sidewall of claim 1, further comprising:
   a drainage trough; and
   a lower wall coupled to the return wall and spaced from the drainage trough, wherein the return wall extends beyond the lower wall to the drainage trough.

4. The sidewall of claim 1, further comprising:
   a drainage trough;
   a lower wall coupled to the return wall and spaced from the drainage trough; and
   a false bottom coupled to the sloped wall above the return wall and lower wall, the false bottom extends beyond the lower wall to the drainage trough.

5. The sidewall of claim 1, further comprising:
   a bottom wall coupled to the outer wall; and
   a false bottom spaced above the return wall, the false bottom extending from the sloped wall to the bottom wall.

6. The sidewall of claim 1, wherein the sloped wall is disposed at an angle greater than 90 degrees and less than about 145 degrees relative to the upper wall.

7. The sidewall of claim 1, wherein the spray cooling assembly further comprises:
   a header pipe;
   a plurality of branch conduits extending non-vertically from the header pipe relative to the centerline of the sidewall; and
   a plurality of nozzles disposed on at least a first branch conduit of the plurality of branch conduits, the plurality of nozzles facing the first surface of the sloped wall.

8. The sidewall of claim 7, wherein the first branch conduit is inclined at an angle substantially identical to an angle of inclination of the sloped wall.

9. A metallurgical furnace comprising:
   a hearth;
   a lid; and
   a sidewall disposed on the hearth, the sidewall comprising:
      an upper wall configured to support the lid thereon;
      an outer wall coupled to an outer side of the upper wall and extending downward from the outer wall;
      a sloped wall having a first end coupled to an inner side of the upper wall, the sloped wall extending downward and inward from the upper wall to a second end to define an inwardly sloped section, the sloped wall having a first surface facing the outer wall and a second surface facing a centerline of the sidewall wherein the second surface of the sloped wall is configured to be exposed to a molten material, and wherein a first distance between the first end and the centerline is greater than a second distance between the second end and the centerline;
      a return wall extending from the sloped wall toward the outer wall, the return wall is sloped downward and outward from the inwardly sloped section of the sloped wall; and
      a spray cooling assembly disposed between the sloped wall and the outer wall, the spray cooling assembly configured to spray coolant on the first surface of the sloped wall.

10. The metallurgical furnace of claim 9, wherein the spray cooling assembly further comprises:

a header pipe;

a plurality of branch conduits extending from the header pipe towards the return wall; and a plurality of nozzles disposed on at least a first branch conduit of the plurality of branch conduits, the plurality of nozzles facing the first surface of the sloped wall.

11. The metallurgical furnace of claim 9, further comprising:

a drainage trough; and a lower wall coupled to the return wall and spaced from the drainage trough, wherein the return wall extends beyond the lower wall to the drainage trough.

12. The metallurgical furnace of claim 9, further comprising:

a drainage trough;

a lower wall coupled to the return wall and spaced from the drainage trough; and a false bottom coupled to the sloped wall above the return wall and lower wall, the false bottom extends beyond the lower wall to the drainage trough.

13. The metallurgical furnace of claim 9, further comprising:

a bottom wall coupled to the outer wall; and a false bottom spaced above the return wall, the false bottom extending from the sloped wall to the bottom wall.

14. The metallurgical furnace of claim 9, wherein the sloped wall is disposed at an angle greater than 90 degrees and less than about 145 degrees relative to the upper wall.

15. The metallurgical furnace of claim 9, wherein the spray cooling assembly further comprises:

a header pipe;

a plurality of branch conduits extending non-vertically from the header pipe relative to the centerline of the sidewall; and a plurality of nozzles disposed on at least a first branch conduit of the plurality of branch conduits, the plurality of nozzles facing the first surface of the sloped wall.

16. The metallurgical furnace of claim 15, wherein the first branch conduit is inclined at an angle substantially identical to an angle of inclination of the sloped wall.

* * * * *